United States Patent [19]

Hong et al.

[11] Patent Number: 4,650,585
[45] Date of Patent: Mar. 17, 1987

[54] METHOD FOR MINIMIZING DIURNAL SWING IN PHOSPHORUS CONTENT OF EFFLUENT STREAMS FROM WASTEWATER TREATING PLANTS

[75] Inventors: Sun-Nan Hong, Emmaus; Marshall L. Spector, Allentown, both of Pa.

[73] Assignee: Air Products and Chemicals, Inc., Allentown, Pa.

[21] Appl. No.: 600,586

[22] Filed: Apr. 17, 1984

[51] Int. Cl.$^4$ .............................................. C02F 3/30
[52] U.S. Cl. .................................. 210/605; 210/614; 210/627; 210/906; 210/903
[58] Field of Search ............... 210/605, 614, 906, 903, 210/630, 627

[56] References Cited

U.S. PATENT DOCUMENTS

| | | | |
|---|---|---|---|
| 4,056,465 | 11/1977 | Spector | 210/7 |
| 4,162,153 | 7/1979 | Spector | 71/12 |
| 4,271,026 | 6/1981 | Chen et al. | 210/605 |
| 4,488,968 | 12/1984 | Hong et al. | 210/906 |

FOREIGN PATENT DOCUMENTS

| | | | |
|---|---|---|---|
| 56-65693 | 6/1981 | Japan | 210/906 |
| 57-167797 | 10/1982 | Japan | 210/605 |
| 58-163496 | 9/1983 | Japan | 210/631 |

OTHER PUBLICATIONS

Wastewater Treatment, Special Report, Jun. 1967, R. H. Marks.

*Primary Examiner*—Benoit Castel
*Attorney, Agent, or Firm*—Mark L. Rodgers; E. Eugene Innis; James C. Simmons

[57] ABSTRACT

Abnormally lowered reduction in the rate of phosphorus removal from influent wastewater in an activated sludge system, occurring particularly following periods of increase in flow rate of wastewater entering the system, is avoided by controlling the maximum F/M in that portion of the system in which oxidation is occurring so as not to exceed 0.9 and maintaining a defined relation between the maximum and minimum F/M during any 24 hour operating period.

8 Claims, 2 Drawing Figures

OPERATIONAL ENVOLOPE TO AVOID PHOSPHOROUS REMOVAL EFFICIENCY FLUCTUATION

METHOD FOR MINIMIZING DIURNAL SWING IN PHOSPHORUS CONTENT OF EFFLUENT STREAMS FROM WASTEWATER TREATING PLANTS

BACKGROUND OF THE INVENTION

1. Field of the Invention

The present invention relates to processes for secondary treatment of wastewater with activated sludge and particularly to such biological wastewater treating systems designed for removal of nutrients, particularly phosphates, in addition to BOD.

2. Prior Art

The activated sludge process has been used for many years for the removal of biological oxygen demand, BOD, from wastewater. The process consists of maintaining an aeration basin in which wastewater is fed to a suspension of microorganisms to form a mixed liquor. The mixed liquor is aerated to furnish oxygen for the respiration of the biomass, which sorbs, assimilates, and metabolizes the biological oxygen demand of the wastewater.

After a suitable period of aeration, the mixed liquor is introduced to a clarifier in which the biomass settles and the treated wastewater overflows into the receiving stream. A major portion of the settled biomass, which is concentrated at the bottom of the clarifier, is recycled to the aeration basin and a minor portion is purged in order to maintain a constant biosolids inventory within the system. This process has been extensively described in the literature and several of its modifications summarized in a special report on "Wastewater Treatment" by R. H. Marks contained in the June 1967 issue of POWER.

A number of techniques have been proposed in more recent years aimed at modification of the conventional activated sludge process to effect or improve removal of nutrients such as nitrogen and/or phosphorus values. Among the various methods disclosed in the prior art for effecting this purpose is that described in U.S. Pat. No. 4,056,465 which in addition to effecting removal of phosphorus and/or nitrogen values from the influent wastewater operates under designed conditions such as to obtain a non-bulking biomass population of highly active, dense and rapidly settling sludge.

In accordance with the process described in the '465 patent the influent wastewater, generally after primary clarification, initially is mixed with recycled sludge in an anaerobic zone and the mixed liquor then is passed to an oxic zone where it is subjected to oxidizing treatment. The oxidized mixed liquor subsequently is passed to a settling zone or clarifier and a portion of the thus activated settled biomass is recycled to the initial anaerobic zone for admixutre with the wastewater influent. The process of the patent is particularly applicable in the treatment of phosphate-containing wastewater. By the initial treatment of the mixed liquor (recycle sludge plus influent wastewater) under anaerobic conditions as described in said patent, which disclosure is herein incorporated by reference, there is a selective production of non-filamentous micro-organisms capable of sorbing BOD under both anaerobic and oxidizing conditions and also capable of accumulating phosphates under oxidizing conditions. When the anaerobically treated mixed liquor is subsequently subjected to treatment with oxygen-containing gas under oxic conditions, the BOD therein is oxidized while phosphates are caused to accumulate in the solid biomass components. A portion of this activated biomass, separated from the oxidized liquor in the subsequent settling operation, is that which is recycled to the anaerobic treating zone.

To achieve the selective production of the desired non-filamentous micro-organisms, which in addition to sorption of BOD are effective in storing polyphosphates under oxidizing conditions (encountered in the subsequent oxic treating zone), the introduction of oxygen-containing gas to the anaerobic treating zone must be avoided; specifically, that zone must also be substantially free of oxides of nitrogen (i.e., less than about 0.3 ppm and preferably less than about 0.2 ppm $NO_x$— as elemental nitrogen) and the dissolved oxygen content of the mixed liquor in the anaerobic zone needs to be below 0.7 ppm and preferably below 0.4 ppm. Additionally, the introduction or presence of other oxidizing agents, e.g., ozone, peroxides, hydroperoxides, chromates, etc., is to be avoided.

The aforesaid '465 patent also describes a variation of the basic process wherein the mixed liquor is passed from the anaerobic zone to an anoxic zone positioned intermediate the anaerobic and oxic zones. The anoxic zone is defined as one receiving a portion of mixed liquor recycled from an oxic zone in which nitrogen oxides are present in concentrations higher than 2 ppm expressed as elemental nitrogen. As in the preceding anaerobic treating zone the dissolved oxygen concentration must be less than 0.7 ppm and the introduction of oxygen-containing gas and other oxidizing agents to the anoxic zone must be avoided. In this modification there is an internal recycle of mixed liquor from the oxic zone back to the anoxic zone, thus providing the nitrogen oxides ($NO_x$) in the anoxic zone. In this modification, the intermediate anoxic treatment of the mixed liquor is employed for effecting denitrification.

Processes of the type described in said U.S. Pat. No. 4,056,465 employed in an activated sludge wastewater treating system an anaerobic mixing and treating zone followed by an oxic oxygenating or aerating zone, are identified as A/0 ® systems, whereas those systems also having an intermediate anoxic treating zone between the anaerobic and oxic zones are sometimes referred to as "A/A/O" or "A²/O" systems.

U.S. Pat. No. 4,162,153 is directed to systems such as described in the companion '465 patent wherein a portion of the settled biomass from the secondary clarifier is recovered for use as a fertilizer or as a nutrient in animal feeds.

Further improvements in the operation of A/O and A²/O systems are described in U.S. Pat. No. 4,271,026. According to this patent, more reliable and enhanced removal of phosphorus values from wastewater influent is obtained by maintaining operating conditions within the processing system encompassing the initial anaerobic treatment and extending through the process up to but not including the sludge separation step, a BOD to phosphorus (BOD/P) ratio from about 5:1 and up to about 50:1, wherein BOD is expressed in milligrams of soluble $BOD_5$ (exclusive of that attributable to ammonia) per liter of influent, and P is soluble phosphate expressed in milligrams of elemental phosphorus per liter of wastewater influent. Also, the system is advocated to be operated at a food to biomass ratio (F/M) from about 0.09 to an upper limit of about 1.4, wherein F is the total weight of soluble BOD introduced into the process per 24 hour day and M is the weight of volatile suspended solids (VSS) in the process system.

It has been found in practice of the process of the '026 patent generally there is significant phosphate removal from the wastewater, but that frequently a reduction in the extent of phosphate removal has been observed even when operating within the guidelines set out in the patent. It was noted that excellent removal of phosphates was had during certain periods of the day and poor removal at others, all while operating within the teachings of the '026 patent. Studies revealed that the concentration of phosphate in the clarifier effluent was increased when the system was operating at high F/M ratio and decreased when operating at low F/M ratio. This situation is effectively remedied in accordance with the present invention by maintaining the minimum and maximum F/M within specified limits during a 24 hour operation period, as hereinafter set out. By operation within the defined limits excellent phosphate removal is achieved throughout the day without significant fluctuation.

SUMMARY OF THE INVENTION

In the study program leading to the present invention it was discovered that when an activated sludge system, in which P as well as BOD is being removed from wastewater influent, is operating at low F/M and then suddenly is operated at a substantially higher F/M, the system required from about one to three passes through the plant (including the aeration basin and clarifier) before it became sufficiently acclimated to functon at the higher F/M level. In the interim, undesirably higher than average phosphorus values appeared in the effluent. This observed phenomenon is surprising in view of the fact that operation at either the low F/M or at the high F/M is acceptable with respect to phosphorus removal.

Apparently, the variation of phosphorus concentration in the clarified effluent was induced by too rapidly shifting from low to high F/M.

The problem of transitory excessive discharge of phosphates in the clarified effluent of a wastewater treating plant is avoided in accordance with the present invention by controlling the maximum F/M during the 24 hour day of operation as not to exceed 0.9. When the maximum F/M during any given 24 hour period is at or above 0.4 the minimum F/M is controlled so as not to fall below 0.2 and when the maximum F/M during the 24 hour period is below 0.4 the minimum F/M is controlled so as not to fall below one-half the maximum F/M during the same 24 hour period and in any event the minimum F/M must be no less than 0.06.

The F/M is preferably controlled to be within the above-designated limits by varying the sludge recycle flow rate with that of the influent flow rate on a continuous or periodic basis. If desired, other means for control of the F/M may be employed as will hereinafter be described.

TERMS AND DEFINITIONS

As employed in defining the parameters of the invention in the present application:

1. F denotes the mass of soluble BOD fed to a given wastewater treating system at a given time extrapolated for 24 hours.

2. M refers to the mass of volatile suspended solids in that basin or basins of the system wherein oxidation is occurring either with oxygen or with oxides of nitrogen ($NO_x$), either or both such basins being hereinafter referred to as an "oxidation zone".

3. F/M min. is the lowest F/M ratio sustained for at least one hour per 24 hour period and F/M max. is the highest F/M ratio sustained for at least one hour during the same 24 hour period.

DESCRIPTION OF PREFERRED EMBODIMENTS

Figure 1:
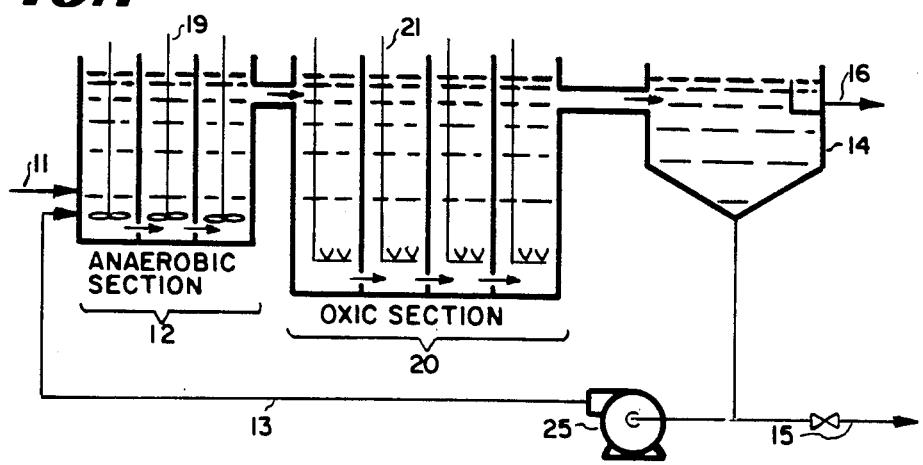
FIG. 1 of the accompanying drawings is a process flow diagram of an embodiment of a typical system that may be employed in practice of the invention.

To illustrate the operation of the invention reference is had to FIG. 1, which is a typical flow diagram of a wastewater treating plant operating in the A/O mode. The wastewater to be treated enters the system through inlet line 11 discharging into the anaerobic basin or section 12 of the system. Typically this wastewater is from a primary sedimentation tank or clarifier (not shown) but primary sedimentation is not a necessary condition for practice of the present invention. In the anaerobic basin the wastewater influent from 11 is stirred and admixed with recycled sludge introduced by line 13. The recycled sludge is part of the settled sludge layer from secondary clarifier 14. A portion of the settled sludge from the clarifier 14 is withdrawn by line 15, while the purified supernatent liquid is discharged overhead and sent to receiving streams or reservoirs via line 16, with or without further treatment.

In systems of the type illustrated in FIG. 1, basin 12 is maintained under strictly anaerobic conditions. The term "anaerobic" is employed in the instant application consistent with the definition in U.S. Pat. No. 4,056,465 as the state existing within a sewage treating zone or basin which is substantially free of $NO_x$ (i.e., less than 0.3 ppm and preferably less than 0.2 ppm expressed as elemental nitrogen), wherein introduction of gaseous oxygen and other oxidizing agents is avoided and conditions are maintained such that the dissolved oxygen concentration (DO) at all points throughout the contents of the zone or basin is less than 0.7 ppm and preferably less than 0.4 ppm. The term "anoxic" is defined as the condition existing within a sewage treating zone or basin wherein introduction of gaseous oxygen is avoided and BOD is metabolized by nitrates and/or nitrites ($NO_x$) from a portion of mixed liquor which is recycled from an oxic zone and which mixed liquor initially has an $NO_x$ concentration higher than 2 ppm expressed as elemental nitrogen, and dissolved oxygen is less than 0.7 ppm, preferably less than 0.4 ppm.

To assure that section 12 of the system is maintained under anaerobic conditions, any one or more of the following steps may be employed. The basin constituting section 12 may be provided with a blanket of an inert gas at the liquid surface to avoid access thereto of atmospheric air; or a loose-fitting or rigid cover may be provided at or above the liquid surface. Instead of or in addition to these precautions nitrogen or other inert purge gas may be admitted into and bubbled up through the mixed liquor in section 12 to strip any oxygen present. Certain plants maintain anaerobic conditions without resort to the described precautions, by avoiding entrainment of air at the liquid surface through limiting the rate or extent of agitation of the mixed liquor at the surface of anaerobic zone.

While not necessarily limited thereto, section 12 is preferably partitioned into two or more liquid treating chambers to maintain plug flow of the liquid through the anaerobic section. In the illustrated embodiment of FIG. 1, section 12 is shown as partitioned into three chambers, each equipped with stirring means 19. The liquid passes through the several chambers of the anaerobic section and discharges into the oxic section or basin 20. Section 20 in the illustrated embodiment is shown as partitioned into four treating chambers, but it will be understood that a greater or lesser number or none of such divisions may be employed, as is the case of section 12. Sections 12 and 20 may be separate interconnected vessels or constructed as a single partitioned basin, provided that backmixing of liquid from section 20 into section 12 is minimized.

In oxic section 20 the mixed liquor is oxidized in known manner. This may be accomplished, for example, by admission of air into the oxic basin by spargers 21 or the oxic basin may be provided with mechanical aerators. Instead of air, oxygen of any desired purity may be admitted to section 20, in which event it may be desired to provide means for covering all or part of that section.

The quantity of oxygen available in this section, either in the form of oxygen of another oxidizing agent, must be sufficient to oxidize at least about 30% of the influent BOD, and preferably at least about 40% of such BOD. In the operation it is desirable to introduce oxygen at a rate equal to the rate of BOD oxidation. It will be understood that introduction of oxygen at this rate will maintain the measured DO at whatever level existed in the liquor in this section at the time of initial BOD and oxygen introduction. For example, when a system of this type is being started up, if the DO level is initially 0 parts per million when BOD introduction is commenced and oxygen is introduced at a rate equal to the rate of BOD oxidation, the measured DO will remain at 0 ppm; as will be understood, if the potential rate of BOD oxidation exceeds the rate of oxygen input, preferred biomass selectively will be lessened and the system will not function optimally. It is prudent, therefore, to run this system with some excess oxygen in this section such as by introducing oxygen at a rate slightly in excess of the BOD oxidation rate. This will result in a measurable, positive DO concentration greater than 0 parts per million such as, for example, at least about 0.1 ppm and preferably at least about 0.2 ppm. Excessive DO concentrations are, of course, to be avoided in that they result in needless expenditures of oxygen and power usage. Thus, it is preferred to maintain a DO level of less than about 2 ppm and preferably at about 1 ppm, although this system will, of course, operate at higher DO levels.

The oxidized liquor leaving the last chamber of basin 20 passes into clarifier 14, wherein a sludge layer settles to the bottom of the clarifier, a portion of which sludge is recycled to the anaerobic section 12.

In the typical operation of a biological wastewater treating facility, the amount of sludge recycled is fixed by the plant design, that amount of recycle being maintained by valve setting or by the operation of the recycle pump at constant speed. The fixed amount of recycle conventionally is maintained in practice irrespective of diurnal variations in quantity and strength of influent wastewater charged to the system. Thus, while the amount of recycle sludge (biomass) being introduced to the anaerobic section 12 is kept constant, diurnal variations in the amount of wastewater influent result in corresponding variation in the ratio of recycle to wastewater influent. Accordingly, even with a substantially constant percent BOD content of the influent wastewater, the F/M ratio in the system changes at intervals during a 24-hour period, with a high F/M ratio being had during a period of greater than average volume of the BOD-containing wastewater influent. Further complicating this situation, it was found that, during periods of high influent flow, there was often an accompanying increase in the percent BOD contained in the wastewater influent, such that the BOD value increased considerably from the daily average. As explained above, as a result of the sudden step-up in the rate of wastewater influent, the presence of abnormally high amounts of soluble phosphate appear in the mixed liquor admitted to the secondary clarifier and being discharged therefrom in the supernatant purified water leaving via line 16.

An effective solution to the problem of diurnal cycling phosphorus in the effluent from biological wastewater treating plants is provided by the present invention. By varying the amount of activated sludge recycled directly with the anticipated loading (F) of the influent wastewater being charged to the system, wide variation in F/M ratio of the system is avoided and kept within tolerable limits, whereby the discharge of excessive quantities of soluble phosphate in the purified water effluent is avoided. In practice of the invention, the return sludge rate may be stepped up prior to the expected start of the high loading (F) period of the day and then backed down in the early evening following the high flow period. Such practice has reduced the F/M variation to a considerable extent by thus maintaining an adequately higher MLVSS in the oxidation zone of the processing system (oxic and anoxic sections) during the high influent flow period. The change in the rate of sludge return is readily accomplished in accordance with one embodiment by the provision and operation of a variable speed recycle pump, as shown at 25. By the processing system is meant the total treating unit from the basin to which the wastewater influent is charged to the final treating basin from which the mixed liquor is passed to the secondary clarifier.

While the operation of the invention has been described above with reference to a wastewater system of the A/O type, it is not limited thereto. When applied to a system of the $A^2/O$ type, such as that illustrated in FIG. 2 of the '465 patent, the variation of the amount of recycle sludge returned in accordance with the diurnal loading variation of the wastewater influent results in also reducing the outflow of inordinate amounts of nitrogen values in the wastewater effluent from the system.

To maintain the F/M ratio within tolerable limits during short periods of high increase in the flow rate of the influent wastewater, the ajustment in the amount of recycled sludge need not be so precise as to maintain a constant or almost constant F/M ratio, provided that the F/M max is maintained at or below about 0.9 and within about the limits with relation to F/M min. within the area bounded by the curve shown in FIG. 2 of the accompanying drawings. Thus, as seen from the curve, the ranges of F/M max. and F/M min. fall within Table 1 below:

TABLE 1

| at F/M max. | F/M min. Range |
| --- | --- |
| 0.9 | 0.2 to 0.9 |
| 0.8 | 0.2 to 0.8 |
| 0.7 | 0.2 to 0.7 |
| 0.6 | 0.2 to 0.6 |
| 0.5 | 0.2 to 0.5 |
| 0.4 | 0.2 to 0.4 |
| 0.3 | 0.15 to 0.3 |
| 0.2 | 0.1 to 0.2 |
| 0.15 | 0.075 to 0.15 |
| 0.1 | 0.06 to 0.1 |
| below 0.15 | not below 0.06 |

In practical operation of a wastewater plant of the A/O or A²/O type, the pattern of diurnal variation in influent flow rate can be determined by observation over a period of several days or more. Where the extent of variation observed is that sufficient to raise the problem or potential problem of excessive phosphate in the effluent, the adjustment of the sludge recycle rate is to be instituted. Such adjustment may be made manually or by setting by program fixed times of the day at which the recycle pump rate is automatically increased and decreased. Such adjustment of the pump rate can be made an hour or more before the significant surge in influent flow rate, preferably at about a time duration of a complete pass of liquid through the processing system including the clarifier. In situations where periodic changes in loading occurs erratically or does not follow a consistent pattern, resort may be had to continuous sampling of the mixed liquor in the oxidation zone with suitable adjustment of the sludge recycle rate being made accordingly.

As an alternative to adjustment of F/M by varying the flow rate of the recycle sludge from the clarifier, all or a portion of the sludge discharged from the system by line 15 may be collected for use as needed to supplement the fresh sludge entering the anaerobic zone via line 13, to maintain the desired F/M ratio. Other known techniques for adjustment of F/M may also be employed, if so desired. For example, if the F/M ratio is too low, an adjustment to the F value can be made by adding "food" to the system. Thus, for example, purchased feedstocks such as methanol, molasses, brewery waste, etc., can be employed. It is also feasible to utilize supernatent liquor from sludge processing as well as high nutrient waste materials available from other sources. In fact, the addition of substantially any form of BOD, including sugar or digester filtrate, can be added to the wastewater influent in order to increase the F/M ratio.

Figure 2:
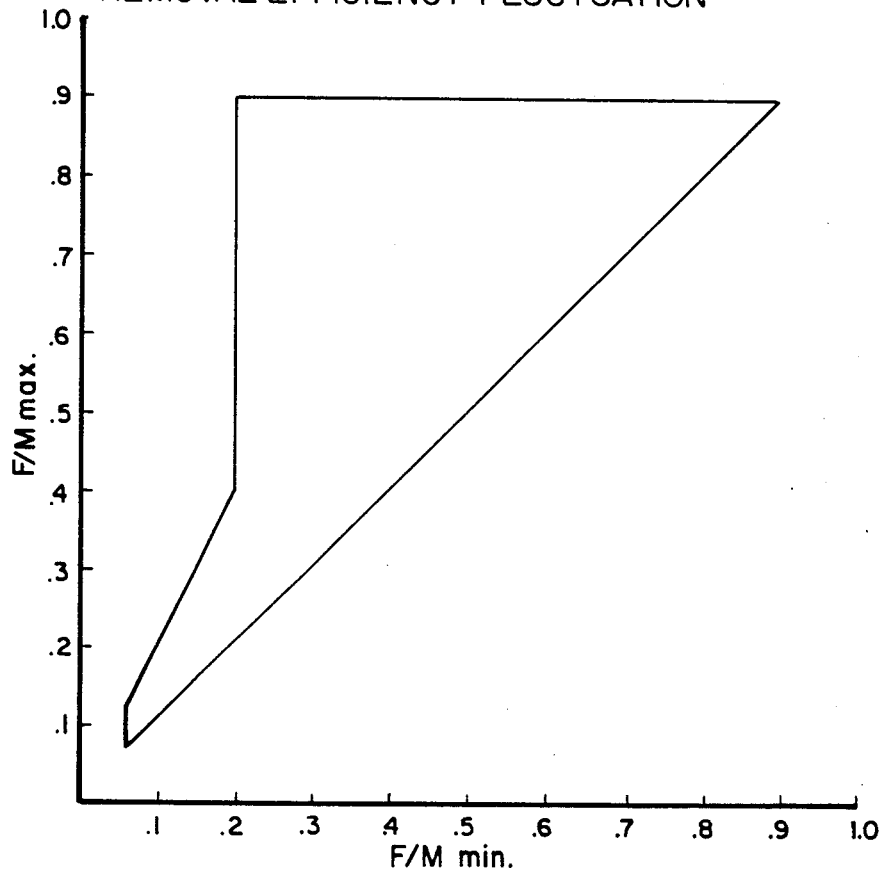
FIG. 2 is a plot showing the relation of the maximum F/M and minimum F/M required to be maintained to obtain enhanced and constant satisfactory phosphate removal from wasetwater influent.

While it is not currently possible to measure the soluble BOD instantaneously so as to enable adjustment of the F/M to maintain a fixed substantially constant F/M ratio throughout daily operation, the desired maintenance of effective phosphate removal is successfully attained by operation, in accordance with the present invention, within the limits of the operational envelope depicted in FIG. 2.

It should be noted that plants in which nitrification is required, generally operate at low average F/M values and control in these cases is much more critical than when running with F/M min. in excess of 0.2. Accordingly, to afford greater latitude in the operation of such plants, one may increase the F/M min. to the 0.2 level or above.

The following Example I illustrates the effect on phosphate removal, in a plant of the A²/O type, operating outside the defined F/M ratios of the invention (IA) as compared to the same plant operated (IB) within the defined F/M limits. The basin had a capacity of 525,000 gallons total, comprising 118,000 gallons anaerobic; 79,000 anoxic and 328,000 gallons oxic.

EXAMPLE I(A)

| Time | F/M | PHOSPHORUS as p INFLUENT (ppm) | EFFLUENT (ppm) | VSS in oxidation zone (ppm) | Q (MGD) | R (MGD) |
| --- | --- | --- | --- | --- | --- | --- |
| 0900 | 0.14 | 5.5 | 0.1 | 2028 | 3.3 | 1.25 |
| 1400 | 0.14 | 5.0 | 1.0 | 1869 | 3.4 | 1.25 |
| 2300 | 0.29 | 5.9 | 2.9 | 1863 | 3.2 | 1.25 |
| 0800 | 0.22 | 5.5 | 0.0 | 1970 | 3.2 | 1.25 |
| Avg. | 0.198 | 5.5 | 1.0 | | | |

EXAMPLE I(B)

| 0800 | 0.16 | 7.2 | 0 | 2504 | 2.7 | 1.25 |
| --- | --- | --- | --- | --- | --- | --- |
| 1430 | 0.23 | 6.0 | 0 | 2433 | 3.8 | 1.25 |
| 2200 | 0.27 | 7.5 | 0 | 2400 | 3.4 | 1.25 |
| 0800 | 0.17 | 5.8 | 0 | 2424 | 2.8 | 1.25 |
| Avg. | 0.22 | 6.4 | 0 | | | |

It will be noted that in the (A) operation phosphate removal fluctuated while in the (B) operation it remained substantially constant with excellent phosphate removal throughout the 24 hour day.

In Example II below are tabulated data taken over separate 24 hour periods in an A/O pilot plant operation of 750 gallon capacity of which 563 gallons were oxic and 187 anaerobic. These data show that good phosphate removal prevailed throughout the day when the plant was operated (A) within the F/M parameters of the invention as contrasted with (B) outside of the defined parameters.

EXAMPLE II(A)

| Time | F/M | PHOSPHORUS as P (ppm) In | Out | VSS (ppm) | Q gal/min | R gal/min | NRT (hrs.) |
| --- | --- | --- | --- | --- | --- | --- | --- |
| 0830 | 0.33 | 7.4 | 0.07 | 5016 | 3.72 | 1.4 | 2.44 |
| 1200 | 0.45 | 6.4 | 0.18 | 4200 | 5.5 | 2.2 | 1.62 |
| 1530 | 0.80 | 4.9 | 0.13 | 3888 | 7.1 | 2.6 | 1.29 |
| 1800 | 0.81 | 5.6 | 0.15 | 4104 | 6.3 | 2.7 | 1.39 |
| 0830 | 0.65 | 7.3 | 0.10 | 4616 | 4.4 | 2.2 | 1.89 |

EXAMPLE II(B)

| 0900 | 0.91 | 12.3 | 0.17 | 4952 | 5.05 | 3.0 | 1.55 |
| --- | --- | --- | --- | --- | --- | --- | --- |
| 1200 | 1.09 | 7.9 | 5.0 | 4216 | 7.3 | 3.7 | 1.14 |
| 1430 | 1.16 | 8.3 | 3.6 | 4496 | 7.3 | 3.7 | 1.14 |
| 1500 | 0.87 | 7.4 | 3.9 | 4512 | 7.4 | 3.7 | 1.13 |

-continued

| 0830 | 0.40 | 8.6 | 0.3 | 4928 | 5.0 | 3.7 | 1.44 |

The method for calculation of F/M is illustrated below, employing the data of Example II(A) a at 0830 hours.
Influent flow rate, Q=3.72 gal/min
Recycle flow rate, R=1.4 gal/min
One gallon wastewater=8.33 pounds
Volume of oxic zone=563 gallons
Total basin volume=750 gallons
$BOD_5$ sol. in influent=174 ppm
VSS in oxic zone=5016 ppm.
Minutes/day=60×24=1440

$$\text{Nominal residence time (NRT)} = \frac{750}{(3.72 + 1.4) 60} = 2.44 \text{ hrs.}$$

$F = 3.72 \times 1440 \times 8.33 \times 174 \times 10^{-6} = 7.76$
$M = 563 \times 5016 \times 10^{-6} \times 8.33 = 23.5$
$F/M = 7.76/23.5 = 0.33$

What is claimed:

1. In the operation of an activated sludge system wherein phosphorus values are removed from influent wastewater in addition to removal of BOD, by reaction with active biomass contained in the recycled sludge admixed with said wastewater influent during the treating process, and wherein the load, F, is subject to significant diurnal variation resulting in substantial decrease in the extent of removal of phosphorus values from said wastewater following substantial increase in F; the method of improving the extent of removal of phosphorus values which comprises: regulating the concentration of biomass relative to the influent flow rate such that the F/M of the mixed liquor in the oxidation zone of the system is between 0.06–0.9, and further that, during a given 24-hour period, the minimum F/M does not fall below 0.2 when the maximum F/M during that period is at or above 0.4 and the minimum F/M does not fall below one-half of the maximum F/M when said maximum F/M during that period is below 0.4.

2. The method as defined in claim 1 wherein the relations of the maximum to minimum F/M in the 24 hour operating period is controlled by adjusting the quantity of activated sludge recycled with respect to the rate of wastewater influent flow to the treating system.

3. The method as defined in claim 1 wherein during any 24 hour period that the maximum F/M is below about 0.12 to no less than about 0.06, the minimum F/M is controlled to lie in the range of not less than about 0.06 in the same 24 hour period.

4. The method as defined in claim 1 wherein a variable speed pump is utilized to adjust the quantity of recycled sludge returned to said treating system.

5. The method as defined in claim 1 wherein during periods of high wastewater influent flow rate the F/M of the system is adjusted by introduction of previously collected and stored activated sludge from the system.

6. The method as defined in claim 1 wherein said activated sludge system comprises an anaerobic zone followed by an oxic zone.

7. The method as defined in claim 1 wherein said activated sludge system comprises an anaerobic zone followed by an anoxic treating section which in turn is followed by an oxic zone.

8. The method as defined in claim 1 wherein during periods of low wastewater influent flow rate, the F/M of the system is adjusted by introduction of previously collected and stored activated sludge from the system.

* * * * *